Patented Nov. 15, 1938

2,136,397

UNITED STATES PATENT OFFICE 2,136,397

OESTROGENOUS PRODUCTS AND METHODS OF PRODUCING THE SAME

Walter Schoeller, Berlin, Max Dohrn, Berlin-Charlottenburg, and Walter Hohlweg, Hohen Neuendorf, near Berlin, Germany, assignors to Schering-Kahlbaum A. G., Berlin, Germany, a corporation of Germany No Drawing. Application December 6, 1934, Serial No. 756,278. In Germany December 6, 1933

9 Claims. (Cl. 167—74)

This invention relates to oestrogenous products, and more particularly to oestrogenous products and methods of producing the same from plants of the genus Butea, and is a continuation in part of our copending application Serial No. 730,066, filed June 11, 1934.

According to said copending application oestrogenous compounds are obtained by treating plants of the genus Butea as they are known in farther India, especially in Siam, by the name "Kwao Kua", with extracting agents, such as alcohol and other organic solvents.

Now it has been found that, contrary to expectations, water is especially suitable for the extraction of the starting material. With water substantially higher yields are achieved than when using the hitherto customary organic solvents, as is shown by the following experiments:

100 grams of dried pulverized *Butea superba* were extracted in a soxhlet apparatus with acetone for 24 hours. Yield: 4.67 grams. On evaluation according to the Allen-Doisy test a total yield of 500 rat units was obtained.

100 grams extracted in the same manner by means of chloroform, yielded 1.195 grams of an extract with altogether 200 rat units.

100 grams treated in the same manner with methanol, yielded 12.3 grams of an extract with 500 rat units.

In contrast hereto 100 grams of the same starting material yielded on extraction with water 5 grams of an extract with 2,000 rat units.

Hence, although even with organic extracting agents a comparatively large amount of rat units is obtained from this particular starting material, nevertheless by extraction with water or aqueous extracting agents considerably higher yields are achieved. The best and simplest method of working up the plants proved to be the lixiviation of tubers of *Butea superba* which were disintegrated by means of a slicing machine, in the same manner as sugar beets are sliced and lixiviated; however, also other extraction methods may be used. The extraction is accelerated by increasing the temperature. Instead of pure water, also diluted water-miscible organic solvents, such as acetone or alcohol, or aqueous solutions the pH-value of which may be varied in accordance with the peculiar properties of these plant hormones, or neutral salt solutions of low concentration may be employed.

Said extracts as they are obtained by means of water or aqueous solvents or according to our copending application Serial No. 730,066 or in any other manner contain, besides other components, large amounts of sugar and sugar-like organic compounds, more particularly so when as primary extracting agents water or aqueous solutions were used. Now, it is a further object of this invention to remove said accompanying substances. For this purpose one may proceed in the following manner:

(1) The extraction residues, after evaporation of the solvent, are treated with such water-miscible solvents which are capable of dissolving the oestrogenous compounds but do not dissolve the sugars and sugar-like accompanying compounds; or (2) The oestrogenous compounds are salted out from their aqueous solutions by the addition of suitable salts whereby the sugars and sugar-like accompanying compounds remain in solution; or (3) The procedures described under 1 and 2, are combined such combination proving especially effective.

Another object of this invention is to remove the saponines from extracts obtained according to our copending application Serial No. 730,066 or in the manner described above or by any other method, and their residues obtained on evaporating the solvent from said extracts. These saponines are quite soluble in water and alcohol and render water-soluble the oestrogenous compounds which in the pure state are rather difficultly water-soluble. For this purpose the extracts are treated with organic solvents in which the oestrogenous compounds are soluble but not the saponines and similar compounds. Solvents which proved very suitable are ether, acetic acid ester and the like.

The surprising observation was made with the oestrogenous compounds obtained according to the processes described in our copending application Serial No. 730,066 and hereinabove as well as in any other manner from plants of the genus of Butea, as they are known in farther India, especially in Siam, by the same "Kwao Kua", that on distributing products containing effective component between aqueous alcohol and benzene, the oestrogenous compound does not pass into the benzene solution but into the aqueous-alcoholic solution. This is in contrast to the follicle hormone, which under the same circumstances is taken up by benzene, and proves again that the follicle hormone and the oestrogenous compound from Butea are not the same substance.

This fact can be made use of for further purifying such products whereby a purification effect is achieved of twice to three times the original degree of purity.

One starts advantageously with such products which have already been subjected to an extensive purification process, for instance with products from which the sugars and sugar-like components and other water-soluble impurities have been removed and which thereafter have been freed from the saponines and similar compounds as described above. But one may also use products which have been previously purified by any other methods.

The following examples serve to illustrate the present invention without, however, limiting the same to them:

Example 1

55 kg. of fresh disintegrated tubers of *Butea superba* (Kwao Kua) are lixiviated with hot water, the aqueous solution is filtered and is evaporated until it has taken up the consistency of a syrup. The extract obtained is divided. The one half, on evaporation to dryness, gives a yield of 2.7 kg. showing a content of 1,100,000 rat units, corresponding to about 400 rat units for the gram. To the other half there is added a large excess of methyl alcohol. The precipitate is filtered off, the extract is evaporated to dryness, the residue is again taken up in methyl alcohol, filtered off and again evaporated to dryness. The yield amounts to 700 grams. The evaluation shows also a yield of 1,100,000 rat units, corresponding to about 1,550 rat units for the gram. Hence, a quantitative yield of units as well as a purification to about four times the original purity is achieved.

Example 2

The 700 grams of the product obtained according to Example 1 (i. e. of a product which has already been preliminarily treated) are taken up in water and salted out by the addition of ammonium sulfate. The precipitated product is filtered off, the filter residue is washed with a little ammonium sulfate solution and thereupon is dissolved in methyl alcohol. The methyl alcoholic solution is filtered and evaporated. The yield amounts to 115 grams. The evaluation shows a total yield of 1 million rat units or of about 8,700 rat units for the gram. Hence, a yield of about 90% as well as a purification to about six times the original purity is achieved.

Other metal salts than ammonium sulfate may also be used as salting-out agent, such as sodium chloride, magnesium chloride, ammonium-phosphate, potassium nitrate and the like, i. e. in general all highly soluble salts which are capable of producing a salting-out effect.

Example 3

1 kilogram of dried and pulverized *Butea superba* (Kwao Kua) is thoroughly extracted with methyl alcohol. The methanolic extract is filtered and evaporated to dryness. By neutralizing the acid filtrate (the extract reacts acid) before the evaporation procedure and separating the impurities precipitated thereby, a further purification can be achieved. But this step is not absolutely necessary since the purification effect is not very great. The product obtained having the weight of 175 grams with total of 50,000 rat units, i. e. about 280 rat units for the gram, is dissolved in water and salted out with ammonium sulfate. After filtering off, the filter residue is washed with concentrated ammonium sulfate solution, is taken up in alcohol, again filtered and evaporated to dryness. The yield amounts to 13.3 grams with altogether 50,000 rat units or about 3,750 rat units for the gram. A quantitative yield of units is achieved as well as a purification to about sixfold.

In the place of *Butea superba*, also other vegetable matter derived from plants of the genus Butea containing these specific oestrogenous compounds, may be used. Suitable solvents for the oestrogenous products are, besides methyl alcohol, also other liquids, such as for instance ethyl alcohol, acetone and the like.

Example 4

115 grams of the product produced according to Example 2 are dissolved in a little methyl alcohol. Thereupon the acid alcoholic solution is preferably neutralized, whereby a small amount of impurities is precipitated. But, this neutralization procedure may be omitted entirely since the effect of purification achieved thereby is only a very slight one. After filtering, the solution is precipitated by the addition of a large excess of ether. The precipitate is filtered off and the precipitation process is repeated twice. The combined filtrates are evaporated. A yield of 20 grams is obtained having a total yield of 1 million rat units, i. e. 50,000 rat units for the gram. Hence, while at the same time the yield of units is quantitative, an almost sixfold purification is achieved. The impurities removed consist mainly of saponines. One may, however, use previously purified extracts of a lower degree of purity as starting materials and also other agents capable of precipitating saponines, such as, for instance, acetic acid ester whereby in any case a considerable purification of the starting materials is accomplished.

Example 5

5 grams of a previously purified product with an activity of 50,000 rat units for the gram, are dissolved in alcohol and are diluted with water to an alcohol content of 70%. The alcoholic-aqueous solution is extracted several times with benzene. The combined benzene solutions are washed twice with 70% alcohol. The alcoholic-aqueous portions are combined and evaporated. A residue of 1.8 grams of the oestrogenous compound having about 130,000 rat units for the gram is obtained. Hence, the yield of rat units is almost quantitative.

The purified oestrogenous product crystallizes from alcohol in white crystal of a melting point 272–276° C., its physiological activity corresponds on subcutaneous application to about 10 million international units for the gram or about 6 million mice units. Its peroral efficiency amounts to about 2 million mice units, i. e. its peroral activity is about 20 to 30 times better than that of the follicle hormone. It is furthermore distinguished from the latter by its chemical properties, especially by its sensitivity towards strong chemicals; thus, alkali or strong acids destroy its biological activity very readily. The presence of several hydroxy groups in its molecule has been proved. Moreover, its formula, which is $C_{19}H_{22}O_6$, is quite different from that of the follicle hormone, whose formula is $C_{18}H_{22}O_2$.

Of course, the given examples serve merely to illustrate the invention; various other modifications and changes in the processes and reagents may be made by those skilled in the art in accordance with the principles set forth herein and in the claims annexed hereto.

What we claim, is:

1. A method for the production of oestrogenous compounds having biological properties similar to but chemical properties different from the follicle hormones comprising subjecting vegetable material derived from plants belonging to the species *Butea superba* to the action of an approximately neutral, aqueous extracting agent which is a solvent for the oestrogenous compounds, isolating the oestrogenous compound from said extract, dissolving the same in water, adding thereto a highly soluble metal salt capable of producing a salting-out effect, and removing the precipitated oestrogenous compound obtained thereby from the solution.

2. A method for the production of oestrogenous compounds having biological properties similar to but chemical properties different from the follicle hormones comprising subjecting vegetable material derived from plants belonging to the species *Butea superba* to the action of an approximately neutral, aqueous extracting agent which is a solvent for the oestrogenous compounds, adding to said extract an organic water-miscible solvent which is capable of dissolving said oestrogenous compound but which does not dissolve the sugars and sugar-like accompanying compounds, removing the precipitate and recovering the oestrogenous compound from the remaining solution, dissolving the same in water, adding thereto a highly soluble metal salt, capable of producing a salting-out effect, and removing the precipitated oestrogenous compound obtained thereby from the solution.

3. A method for the production of oestrogenous compounds having biological properties similar to but chemical properties different from the follicle hormones comprising subjecting vegetable material derived from plants belonging to the species *Butea superba* to the action of water, adding to said aqueous extract a water-miscible organic solvent which is capable of dissolving said oestrogenous compound but which does not dissolve the sugars and sugar-like accompanying compounds, removing the precipitate and recovering the oestrogenous compound from the remaining solution, dissolving the same in water, adding thereto a highly soluble metal salt capable of producing a salting-out effect, and removing the precipitated oestrogenous compound obtained thereby from the solution.

4. A method for purification of extracts of oestrogenous compounds obtained from vegetable material derived from plants belonging to the species *Butea superba* and containing saponines and similar compounds, comprising treating said extracts with an organic water-non-miscible solvent which is capable of dissolving the oestrogenous compounds, but not the saponines and the like compounds, removing the precipitate obtained thereby, and recovering the oestrogenous compound from the solution.

5. A method for the production of oestrogenous compounds having biological properties similar to but chemical properties different from the follicle hormones comprising subjecting vegetable material derived from plants belonging to the species *Butea superba* to the action of approximately neutral aqueous extracting agents capable of dissolving the oestrogenous compounds, adding to said extract a water-miscible organic solvent which is capable of dissolving said oestrogenous compound but which does not dissolve the sugars and sugar-like accompanying compounds, removing the precipitate and isolating the oestrogenous compound from the remaining solution, dissolving the same in water, adding thereto a highly soluble metal salt capable of producing a salting-out effect, and removing the precipitated oestrogenous compound obtained thereby from the solution, dissolving said compound in a water-miscible organic solvent, adding to said solution an organic water-non-miscible solvent which is capable of dissolving the oestrogenous compounds, but not the saponines and the like compounds, removing the precipitate obtained thereby, and recovering the oestrogenous compound from the solution.

6. A method for the production of oestrogenous compounds having biological properties similar to but chemical properties different from the follicle hormones comprising subjecting vegetable material derived from plants belonging to the species *Butea superba* to the action of an approximately neutral, aqueous extracting agent capable of dissolving the oestrogenous compounds, adding to said extract a water-miscible organic solvent which is capable of dissolving said oestrogenous compound but which does not dissolve the sugars and sugar-like accompanying compounds, removing the precipitate and isolating the oestrogenous compound from the remaining solution, dissolving the same in water, adding thereto a highly soluble metal salt capable of producing a salting-out effect, removing the precipitated oestrogenous compound obtained thereby from the solution, dissolving said compound in a water-miscible organic solvent, adding to said solution an organic water-non-miscible solvent which is capable of dissolving the oestrogenous compounds, but not the saponines and the like compounds, removing the precipitate obtained thereby, isolating the oestrogenous compound from the solution, subjecting the oestrogenous compound isolated from said extracts to a separating and distributing treatment between water-miscible organic solvents which are diluted with water, and water-non-miscible organic solvents, whereby the oestrogenous compound passes into the aqueous organic solvent, separating the aqueous solution from the non-aqueous solution and recovering the purified oestrogenous compound from the aqueous solution.

7. In a method for the production of oestrogenous compounds having biological properties similar to but chemical properties different from the follicle hormones, the steps which comprise subjecting vegetable material derived from plants belonging to the species *Butea superba* and containing oestrogenous substances to the action of an approximately neutral, aqueous extracting agent capable of dissolving the oestrogenous material, and isolating the oestrogenous material from the aqueous extract.

8. A method for the production of oestrogenous compounds having biological properties similar to but chemical properties different from the follicle hormones comprising subjecting vegetable material derived from plants belonging to the species *Butea superba* and containing oestrogenous substances to the action of an approximately neutral, aqueous extracting agent, adding to said extract a water-miscible organic solvent which is capable of dissolving said oestrogenous compound but which does not dissolve the sugars and sugar-like accompanying compounds, removing the precipitate and recovering the oestrogenous compound from the remaining solution.

9. A method for the separation of oestrogenous material from an impure oestrogenous extract obtained by treating vegetable material derived from plants belonging to the species *Butea superba* with a substantially neutral extracting agent for such material, comprising treating such extract with a soluble metal salt capable of producing a salting-out effect to cause precipitation of the oestrogenous material, and removing the precipitate from the solution.

WALTER SCHOELLER.
MAX DOHRN.
WALTER HOHLWEG.